March 11, 1941.     W. S. McDONALD     2,234,411
DEVICE FOR MAKING DENTAL PLATES
Filed Oct. 19, 1940
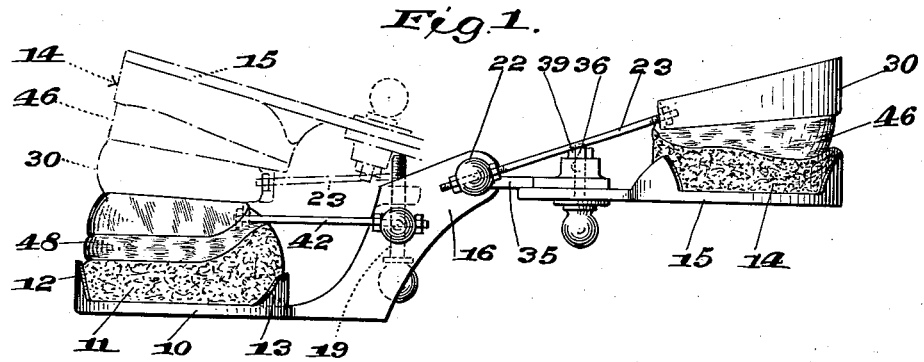
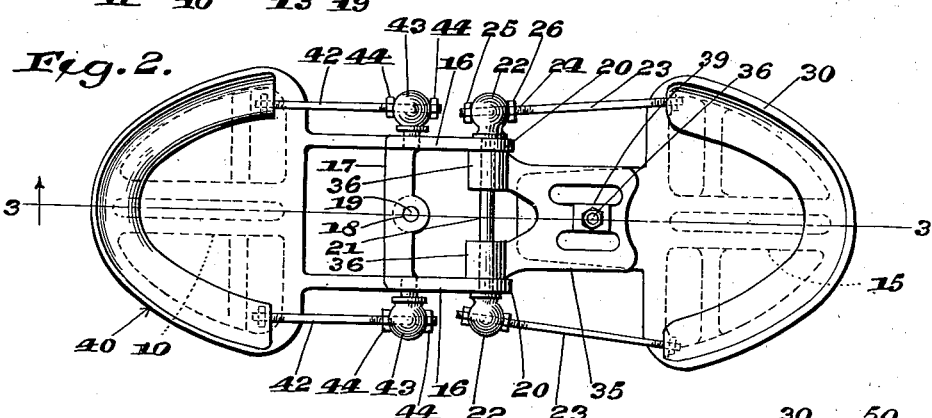
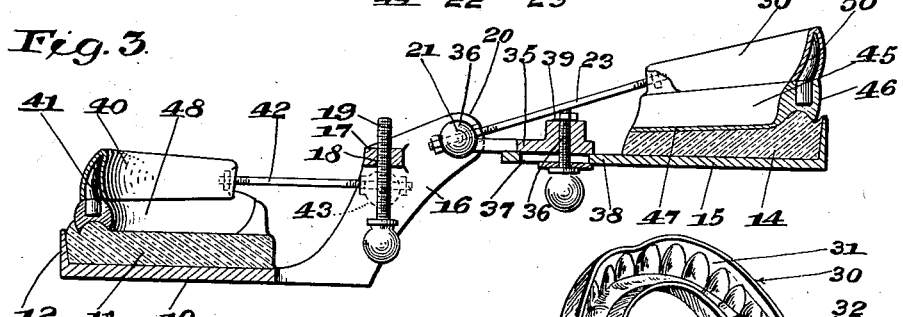
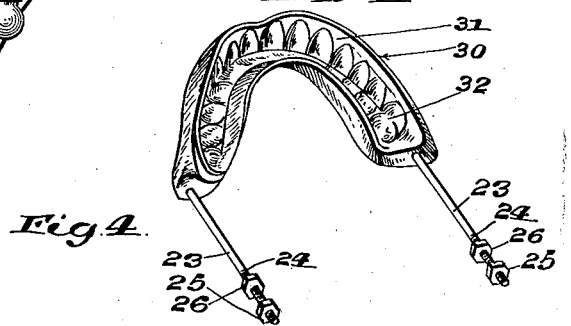
Inventor
William S. McDonald
By Munn, Anderson & Liddy
Attorney Patented Mar. 11, 1941

2,234,411

UNITED STATES PATENT OFFICE 2,234,411

DEVICE FOR MAKING DENTAL PLATES

William S. McDonald, Shawnee, Kans.

Application October 19, 1940, Serial No. 361,971

9 Claims. (Cl. 32—32)

This invention relates to a device for making dental plates.

An object of the invention is the provision of a device for properly positioning synthetic teeth so that the wax which forms a foundation for the teeth and in which the teeth are imbedded may be placed in and around the teeth to form the usual dental plate, while maintaining the proper positions of the plates in accordance with the correct articulation.

Another object of the invention is the provision of a device for forming dental plates of the usual materials in which a pair of matrices are coordinated in the correct articulation so that when both the upper and lower plates have been made or either the upper or lower plate has been made, the plate or plates when placed in the mouth will have the proper articulation with respect to the upper and lower sets of teeth.

A further object of the invention is the provision of a device for making dental plates in which the matrices are supported in the holders with means for supporting and properly positioning the synthetic teeth, the holders being so arranged and swingable upon each other that the correct fitting of the jaws may be simulated by the swingable holders which are capable of adjustment away from each other and adapted to be alined upon each other.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Fiv. 1 is a side view in open position of the device for making dental plates,

Fig. 2 is a plan view of the device shown in Fig. 1,

Fig. 3 is a longitudinally vertical section taken along the line 3—3 of Fig. 2,

Fig. 4 is a view in perspective of the device for supporting the teeth in proper sequence before the application of the usual material which forms the dental plate.

Referring more particularly to the drawing, 10 designates a holder for a matrix 11 formed of plastic material which is usually plaster of Paris or some similar quick-setting cement. Upstanding fingers or lugs 12 and 13 are connected with the holder 10 for aiding and maintaining the matrix in position.

As it is well known, an impression is made of the teeth with some kind of plastic material which will not readily harden and which will maintain its shape after it has been removed from the mouth. Plastic material which forms the matrix 11 is poured into the mold which has been removed from the mouth and allowed to harden within the holder 10. The impression is also made of the upper row of teeth or the gum if the teeth have been removed, and a matrix is formed from the impression as shown at 14 and supported within a holder 15.

Extending upwardly from the inner end of the holder 10 is a pair of arms 16 which are connected together intermediate the ends thereof by a bar 17 which is horizontally disposed and which is provided with a threaded opening 18 to receive a set screw 19. It will be noted that the arms 16 are curved outwardly from the holder 10 and terminate in a pair of free ends 20.

A horizontal shaft 21 is located in bearings in the free ends 20 of the arms 16. The outer ends of the shaft are provided with bosses 22 which receive the rods 23. The inner ends of these rods as shown at 24 are threaded where they pass through the bosses 22 and nuts 25 and 26 are located upon opposite sides of each boss for securing the rods 23 in place.

A counterdie 30 is U-shaped and is provided with a curved channel 31 having pockets 32 arranged around the bottom and side walls of the channel. These pockets have the same configuration as the crown portions of the synthetic teeth so that said teeth will be fitted and arranged in the pockets in proper order within the channel 31.

An arm 35 has bearings 36 which receive the shaft 21. The arm is provided with a bolt 36 which passes through a slot 37 in an extension 38 on the holder 15. A nut 39 is screwed onto the upper end of the bolt 36 and locks the bolt in position. It will be seen by this construction that the holder 15 may be adjusted towards the right or left in the figures for properly positioning the counterdie 30 with respect to a counterdie 40 which supports the synthetic teeth 41 over the matrix 11. Thus it will be seen that the correct articulation between the upper and lower jaws can be had and this is particularly important because of the variation in the articulation of the jaws of human beings.

When the extension 38 is adjusted relative to the arm 35 the same adjustment is made by changing the position of the nuts 25 and 26 which connect the rods 23 with the bosses 22.

The counterdie 40 is supported by rods 42 which pass through perforations in bushings 43 which are rotatedly mounted within the arms 16 and located laterally and exteriorly of said arms. Nuts 44 are threaded upon the rods 42 upon opposite sides of the bosses 43 so that when these nuts are loosened the counterdie 40 may be moved towards or away from the arms 16.

It will be noted from an inspection of Figs. 1 and 3 that the usual wax 45 is impressed upon the matrix 14 and also upon the matrix 11, with the portion 46 representing the gum while the thin portion 47 is adapted to be placed in close association with the palate of the oral cavity. The usual form of wax is impressed upon the matrix 11 with the portion 48 simulating the lower gum of the oral cavity and the synthetic teeth which are supported by the die 40 are imbedded within the wax 48 while the synthetic teeth 50 are imbedded in the wax 46.

After the wax has been shaped and positioned it is then trimmed and burnished after which it is baked in the usual manner to obtain the necessary hardness.

As shown in Fig. 1, when all of the parts are assembled in superimposed relation, the crowns of the synthetic teeth located within the counterdies 30 and 40 will be so placed with respect to each other that the crowns of the upper set of teeth are neatly seated upon the crowns of the lower set because the pockets 32 within the counterdies 30 and 40 are located in the proper position by the adjustment of the rods 23 and 42, and when the completed plates are placed upon each other the crowns of the teeth of the upper and lower plates will properly aline.

The adjustment of the holder 15 on the arm 35 and the adjustment of the rods 23 are made when necessary in order to correctly simulate the articulation of the jaws of the patient.

It will be appreciated that due to variations in the shapes of the jaws of human beings that a certain number of counterdies must be employed so that a counterdie will be available for each particular configuration of the human jaws.

I claim:

1. A device for making dental plates comprising a frame having a holder for receiving a matrix formed from an impression of the lower jaw, a counterdie adapted to support false teeth, means pivotally mounting the die on the frame, a holder for a matrix formed from an impression of the upper jaw, means pivotally mounting the holder on the frame, a second counterdie for supporting false teeth corresponding to the number required to complete the upper set, and means pivotally mounting the second die on the frame, said dies interfitting and seating upon each other, said dies and holders being so positioned relative to each other that correct articulation between the parts is had.

2. A device for making dental plates comprising a frame having a holder for receiving a matrix formed from an impression of the lower jaw, a counterdie adapted to support false teeth, means pivotally mounting the die on the frame, a holder for a matrix formed from an impression of the upper jaw, means pivotally mounting the holder on the frame, a second counterdie for supporting false teeth corresponding to the number required to complete the upper set, and means pivotally mounting the second die on the frame, said dies interfitting and seating upon each other, said dies and holders being so positioned relative to each other that correct articulation between the parts is had, each die having a channel for receiving the teeth.

3. A device for making dental plates comprising a frame having a holder for receiving a matrix formed from an impression of the lower jaw, a counterdie adapted to support false teeth, means pivotally mounting the die on the frame, a holder for a matrix formed from an impression of the upper jaw, means pivotally mounting the holder on the frame, a second counterdie for supporting false teeth corresponding to the number required to complete the upper set, and means pivotally mounting the second die on the frame, said dies interfitting and seating upon each other, said dies and holders being so positioned relative to each other that correct articulation between the parts is had, each die having a channel for receiving the teeth, the bottoms of the channels having sockets for receiving and properly positioning the teeth.

4. A device for making dental plates comprising a pair of holders for a pair of matrices, a supporting frame having legs projecting from one end and connected to one holder, an arm pivotally mounted on the other end of the frame and connected to the holder, a pair of counterdies pivotally connected to the frame and located between the holders, each die adapted to support false teeth, the dies and holders being so arranged that when they are disposed in superimposed relation there will be proper articulation between the sets of teeth.

5. A device for making dental plates comprising a pair of holders for a pair of matrices, a supporting frame having legs projecting from one end and connected to one holder, an arm pivotally mounted on the other end of the frame and connected to the holder, a pair of counterdies pivotally connected to the frame and located between the holders, each die being provided with a groove so shaped that it will correspond to the configuration of a set of teeth, the bottom of each groove having sockets to receive the teeth, the dies and holders being so arranged that when they are disposed in superimposed relation there will be proper articulation between the sets of teeth.

6. A device for making dental plates comprising a substantially vertical frame, having an offset portion at the upper end, a matrix holder extending from the lower end of the frame, a counterdie having pivotal connections with the frame and adapted to be disposed substantially in a horizontal plane above the holder, a second counter die adapted to rest on the first-mentioned die, means swingably mounting the second die on the offset portion, a second matrix holder, means swingably mounting the second holder on the offset portion so that the second holder may be moved into operative relation with the second die, each of the dies being provided with means for supporting a series of false teeth in a natural arrangement as found in the human mouth.

7. A device for making dental plates comprising a substantially vertical frame having an offset portion at the upper end, a matrix holder extending from the lower end of the frame, a counterdie having pivotal connections with the frame and adapted to be disposed substantially in a horizontal plane above the holder, a second counter die adapted to rest on the first-mentioned die, means swingably mounting the second die on the offset portion, a second matrix holder, means swingably mounting the second holder on the offset portion so that the second holder may be moved into operative relation with the second die, each of the counter dies being provided with a groove with sockets in the bottom of the groove to receive teeth, said groove having the natural configuration of a set of human teeth, the grooves opening in opposite directions.

8. A device for making dental plates comprising a substantially vertical frame, having an offset portion at the upper end, a matrix holder extending from the lower end of the frame, a counterdie having pivotal connections with the frame and adapted to be disposed substantially in a horizontal plane above the holder, a second counter die adapted to rest on the first-mentioned die, means swingably mounting the second die on the offset portion, a second matrix holder, means swingably mounting the second holder on the offset portion so that the second holder may be moved into operative relation with the second die, each of the dies being provided with means for supporting a series of false teeth in a natural arrangement as found in the human mouth, and means limiting the movement of the holders towards each other when the matrices and counter dies are located in superimposed relation.

9. A device for making dental plates comprising a substantially vertical frame, having an offset portion at the upper end, a matrix holder extending from the lower end of the frame, a counterdie having pivotal connections with the frame and adapted to be disposed substantially in a horizontal plane above the holder, a second counter die adapted to rest on the first-mentioned die, means swingably mounting the second die on the offset portion, a second matrix holder, an arm swingably mounted on the offset portion, the second holder slidably mounted on the arm, means rigidly connecting the slidable holder to the arm for predeterminately positioning the holder for alinement with the second-mentioned die, each of the dies being provided with means for supporting a series of false teeth in a natural arrangement as found in the human mouth.

WILLIAM S. McDONALD.